(12) United States Patent
Huang et al.

(10) Patent No.: US 12,125,613 B2
(45) Date of Patent: Oct. 22, 2024

(54) CABLE, BATTERY AND ELECTRICITY CONSUMING DEVICE

(71) Applicant: CONTEMPORARY AMPEREX TECHNOLOGY (HONG KONG) LIMITED, Hong Kong (CN)

(72) Inventors: Zhijie Huang, Ningde (CN); Zhiming Chen, Ningde (CN); Xin Pan, Ningde (CN); Xiaoyin Yu, Ningde (CN); Huimin Miao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/596,143

(22) Filed: Mar. 5, 2024

(65) Prior Publication Data

US 2024/0212882 A1    Jun. 27, 2024

Related U.S. Application Data

(63) Continuation of application No. PCT/CN2022/136445, filed on Dec. 5, 2022.

(30) Foreign Application Priority Data

Jan. 13, 2022 (CN) .......................... 202220082004.9

(51) Int. Cl.
*H01B 7/29* (2006.01)
*H01B 7/18* (2006.01)
(Continued)

(52) U.S. Cl.
CPC ........... *H01B 7/292* (2013.01); *H01B 7/1845* (2013.01); *H01M 50/209* (2021.01);
(Continued)

(58) Field of Classification Search
CPC .......... H01B 7/292; H01B 7/08; H01B 7/184; H01B 7/1845; H01B 7/185; H01M 50/507; H01M 50/298
(Continued)

(56) References Cited

U.S. PATENT DOCUMENTS

2021/0234239 A1* 7/2021 Kita ..................... H01M 50/572

FOREIGN PATENT DOCUMENTS

CN   101174491 A    5/2008
CN   102176795 A    9/2011
(Continued)

OTHER PUBLICATIONS

The World Intellectual Property Organization (WIPO) International Search Report and Written Opinion for PCT/CN2022/136445 Mar. 2, 2023 13 Pages (including translation).

*Primary Examiner* — James M Erwin
*Assistant Examiner* — John S Medley
(74) *Attorney, Agent, or Firm* — ANOVA LAW GROUP, PLLC

(57) ABSTRACT

A cable for a battery includes a conductive member that extends in a longitudinal direction of the cable, an expansion member spaced with the conductive member, and an insulation member covering the periphery of the conductive member and the expansion member. The insulation member has a through hole. The expansion member is configured to expand and overflow to the outer surface of the insulation member through the through hole when the temperature reaches a threshold.

12 Claims, 5 Drawing Sheets

(51) Int. Cl.
*H01M 50/209* (2021.01)
*H01M 50/298* (2021.01)
*H01M 50/507* (2021.01)
*H01B 7/08* (2006.01)

(52) U.S. Cl.
CPC ....... *H01M 50/298* (2021.01); *H01M 50/507* (2021.01); *H01B 7/0823* (2013.01)

(58) Field of Classification Search
USPC .......................................................... 429/158
See application file for complete search history.

(56) References Cited

FOREIGN PATENT DOCUMENTS

| | | | | | |
|---|---|---|---|---|---|
| CN | 206259206 | U | | 6/2017 | |
| CN | 210743655 | U | | 6/2020 | |
| CN | 211125143 | U | | 7/2020 | |
| CN | 112368787 | A | | 2/2021 | |
| CN | 112735652 | A | * | 4/2021 | ......... H01B 13/2613 |
| CN | 217158543 | U | | 8/2022 | |
| EP | 0995203 | B1 | * | 4/2011 | ............. H01B 11/10 |
| EP | 3279905 | B1 | * | 6/2021 | ............. H01B 13/24 |
| JP | 2011113928 | A | | 6/2011 | |

* cited by examiner

CABLE, BATTERY AND ELECTRICITY CONSUMING DEVICE

CROSS-REFERENCE OF RELATED APPLICATIONS

The present application is a continuation of International Application No. PCT/CN2022/136445, filed on Dec. 5, 2022, which claims priority to Chinese patent application No. 202220082004.9 filed on Jan. 13, 2022, the entire contents of both of which are hereby incorporated by reference.

TECHNICAL FIELD

The present application relates to the technical field of the battery and energy storage equipment, in particular to a cable, a battery, and an electricity consuming device.

BACKGROUND

Energy conservation and emission reduction are key to the sustainable development of the automotive industry, and the electric vehicle has become an important component of the sustainable development of the automotive industry due to its advantages in energy conservation and environmental protection. For the electric vehicle, battery technology is also an important factor related to their development.

In existing battery manufacturing processes, the relevant internal components inside the battery are connected to the controllers outside the battery through cables to collect information such as voltage and temperature inside the battery. However, in some cases, the presence of cable can cause certain safety issue for the battery. Therefore, how to improve the safety of the battery installed with a cable is an urgent problem to be solved currently.

SUMMARY

In view of the above issue, the present application provides a cable, a battery, and an electricity consuming device, which can improve the operation safety of the battery.

In a first aspect, the present application provides a cable for a battery, which includes: a conductive member extending in a longitudinal direction of the cable; an expansion member spaced with the conductive member; and an insulation member covering the periphery of the conductive member and the expansion member, and the insulation member having a through hole, wherein the expansion member is configured to expand and overflow to the outer surface of the insulation member through the through hole when the temperature reaches a threshold.

The cable provided in the present application is provided with an expansion member which expands and overflows to the outer surface of the insulation member through a through hole when the temperature reaches the threshold. Therefore, when the temperature of the battery cell and other components inside the battery is too high, the expansion member overflows and protects the insulation member, reducing the risk of short circuit between the conductive member of the cable and other components inside the battery caused by the melting of the insulation member, and further reducing the risk of a larger range of temperature rise inside the battery and improving the operational safety of the battery.

In some embodiments, the cable includes a plurality of the through holes which are spaced in the longitudinal direction. This arrangement ensures that the insulation member of the cable can cover more expansion members, providing better heat resistance and better protection for the insulation member.

In some embodiments, the plurality of the through holes are equally spaced. In this way, the insulation member can be more evenly covered by the expansion member.

In some embodiments, the cross-section of the through hole perpendicular to an axial direction of the through hole is circular, elliptical, or rectangular. This arrangement can improve the smoothness of the expansion member overflowing through the through hole.

In some embodiments, the cable includes a plurality of the conductive members, which are spaced in a first direction, at least one expansion member is arranged between the spaced conductive members and the first direction is perpendicular to the longitudinal direction. In this way, it is beneficial for the cable to be formed into a flat structure, thereby improving the space utilization rate of the cable in the battery.

In some embodiments, the through hole is arranged at at least one end of the expansion member along a second direction, with the second direction, first direction, and longitudinal direction perpendicular to each other. This arrangement can still cause the expansion member to cover the surface of the insulation member after the expansion member overflows.

In some embodiments, the expansion member is arranged on each side of the conductive member along the second direction, and the second direction, first direction, and longitudinal direction are perpendicular to each other. This arrangement can better ensure that after the expansion member overflows, the expansion member covers the surface of the insulation member along the second direction on both sides more.

In some embodiments, along the second direction, the through hole is arranged on the side of the expansion member away from the conductive member. This arrangement can improve the smoothness of the expansion member overflowing through the through hole.

In some embodiments, the expansion member includes an insulating expansion body and a wrapping member covering the insulating expansion body. The melting point of the wrapping member is lower than that of the insulation member. The wrapping member is configured to melt when the temperature reaches a threshold, and the insulating expansion body is configured to expand and overflow to the outer surface of the insulation member through the through hole when the wrapping member melts. This arrangement is beneficial for controlling the expansion temperature of the expansion member, and the insulating expansion body can further reduce the risk of short circuit occurring in the conductive member.

In some embodiments, the material of the insulating expansion body includes expandable graphite. The expandable graphite has a low price, good insulation and high melting point, which is beneficial for improving the insulation between the conductive member and the outside and further reducing the risk of short circuit of the conductive member.

In some embodiments, the material of the wrapping member includes polyethylene terephthalate, and the material of the insulation member includes polypropylene. It can effectively ensure that the wrapping member begins to melt before the insulation member melts, in order to release the insulating expansion body.

In a second aspect, the present application provides a battery, comprising: a plurality of battery cells; a busbar electrically connected to the plurality of the battery cells;

and the cable provided in any of the above embodiments, wherein the conductive member of the cable is connected to the busbar.

In a third aspect, the present application provides an electricity consuming device, including a battery provided in the above embodiments, wherein the battery is configured to provide electrical energy.

In the cable, the battery, and the electricity consuming device provided in the present application, by disposing the cable to include an expansion member, and disposing the expansion member to expand and overflow to the outer surface of the insulation member through the through hole when the temperature reaches a threshold, when the temperature of the battery cell and other components inside the battery is too high, the expansion member overflows and protects the insulation member, reducing the risk of short circuit between the conductive member of the cable and other components inside the battery caused by the melting of the insulation member, and further reducing the risk of a larger range of temperature rise inside the battery and improving the operational safety of the battery.

The above description is only a brief explanation of the technical solution of present application. Below specific embodiments of the present application are described in order to make the technical means of present application better understood so that it can be implemented according to the disclosure of the specification, and to make the above and other purposes, features, and advantages of the present application more obvious and understandable.

BRIEF DESCRIPTION OF THE DRAWINGS

In order to provide a clearer explanation of the technical solution of the embodiments of the present application, a brief introduction will be given to the accompanying drawings required in the embodiments of the present application. It is evident that the accompanying drawings described below are only some embodiments of the present application. For ordinary skilled person in the art, other accompanying drawings can be obtained based on the drawings without any creative effort.

Figure 1:
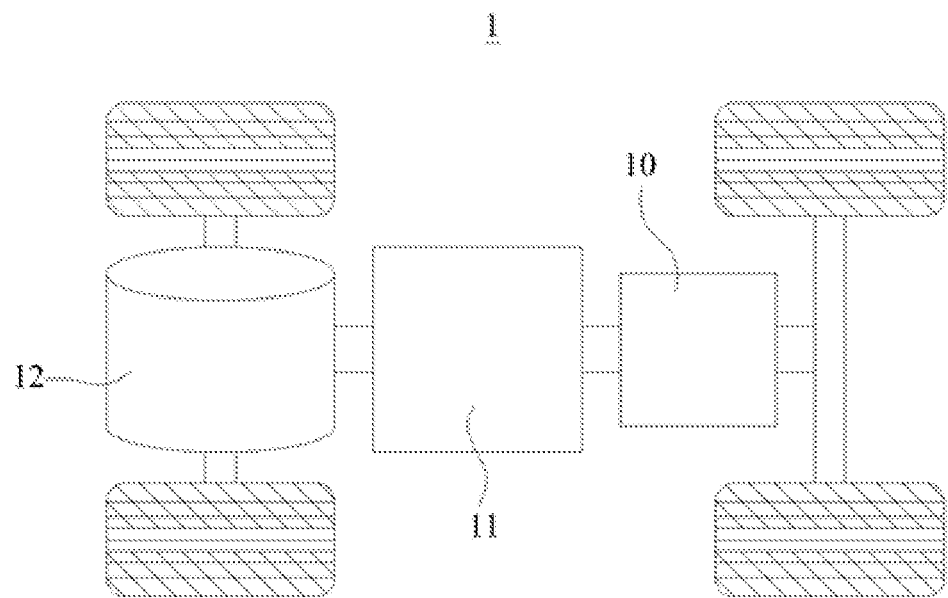
FIG. 1 is a structural schematic diagram of a vehicle provided in an embodiment of the present application.

In the accompanying drawings, the drawings are not necessarily drawn to the actual scale.

DESCRIPTION OF THE REFERENCE SIGNS

1. Vehicle; 10. Battery; 11. Controller; 12. Motor;
20. Battery module; 21. Battery cell; 22. Busbar;
30. Casing; 31. First casing body; 32. Second casing body;
40. Cable; 41. Conductive member; 42. Expansion member; 421. Insulating expansion body; 422. Wrapping member; 43. Insulation member; 43a, through hole;
X. Longitudinal direction; Y. First direction; Z. Second direction.

DETAILED DESCRIPTION

The following will provide a detailed description of the embodiments of the technical solution of the present application in conjunction with the accompanying drawings. The following embodiments are only used to provide a clearer explanation of the technical solution of the present application, and therefore are only examples and cannot be used to limit the scope of protection of the present application.

It should be noted that, unless otherwise specified, the technical or scientific terms used in the embodiments of the present application shall have the usual meaning understood by the skilled person in the art to which the embodiments belong.

In the description of the embodiments of the present application, the orientation or positional relationship indicated by the technical terms "center", "vertical", "horizontal", "length", "width", "thickness", "up", "bottom", "front", "back", "left", "right", "vertical", "horizontal", "top", "bottom", "inside", "outside", "clockwise", "counterclockwise", "axial direction", "radial direction", "circumferential direction", etc. is based on the orientation or positional relationship shown in the attached drawings, and is only for the convenience of describing the embodiments of the present application and simplifying the description, rather than indicating or implying that the device or component referred to must have a specific orientation, be constructed and operated in a specific orientation. Therefore, it cannot be understood as a limitation for the embodiments of the present application.

In addition, the technical terms "first", "second", etc. are only used for descriptive purposes and cannot be understood as indicating or implying relative importance or implying the quantity of indicated technical features. In the description of the embodiments of the present application, the meaning of "multiple" refers to two or more, unless otherwise specified.

In the description of the embodiments of the present application, unless otherwise specified and limited, the technical terms "install", "connected with", "connect", "fix" and other terms should be broadly understood, for example, they can be fixed connection, detachable connection, or be integrated. It can also be a mechanical connection or an electrical connection. It can be directly connected or indirectly connected through an intermediate medium, and it can be an internal communication between two components or an interaction relationship between two components. For the skilled person in the art, the specific meanings of the above terms in the embodiments of the present application can be understood based on specific circumstances.

In the description of the embodiments of the present application, unless otherwise specified and limited, the first feature "on" or "under" the second feature can indicate that the first feature is in direct contact with the second feature, or the first feature may be in indirect contact with the second feature through intermediate media. Moreover, the first feature "above" the second feature can indicate that the first feature is directly or diagonally above the second feature, or simply indicates that the horizontal height of the first feature is larger than that of the second feature. The first feature "below" the second feature can indicate that the first feature is directly or diagonally below the second feature, or simply indicates that the horizontal height of the first feature is less than that of the second feature.

At present, based on the development of the market situation, the application of power battery is becoming increasingly widespread. Power battery is not only used in energy storage power systems such as hydropower, firepower, wind power, and solar power plant, but also widely used in electric vehicle such as electric bicycle, electric motorcycle, and electric automobile, as well as in various fields such as military equipment and aerospace. With the continuous expansion of the application field of power battery, its market demand is also constantly expanding.

In the present application, the battery cell can include lithium-ion secondary battery cell, lithium-ion primary battery cell, lithium-sulfur battery cell, sodium lithium ion battery cell, sodium ion battery cell, or magnesium ion battery cell. The embodiments of present application are not limited to thereto. The battery cell can be in cylindrical, flat, cuboid, or other shapes, and the embodiments of the present application are not limited to thereto.

The battery mentioned in the embodiment of the present application refers to a single physical module that includes one or more battery cells to provide higher voltage and capacity. For example, the battery mentioned in the present application may include battery module or battery pack, etc. Battery generally include a casing used to encapsulate one or more battery cells. The casing can prevent liquid or other foreign objects from affecting the charging or discharging of the battery cell.

The battery cell includes an electrode assembly and an electrolyte, and the electrode assembly includes a positive electrode plate, a negative electrode plate, and a separator. The battery cell mainly relies on metal ions moving between the positive and negative electrode plates to operate. The positive electrode plate includes a positive electrode current collector and a positive electrode active substance layer which is applied on a portion of the surface of the positive electrode current collector. The positive electrode current collector includes a positive electrode current collecting part and a positive electrode tab connected to the positive electrode current collecting part. The positive electrode current collecting part is coated with a positive electrode active substance layer, while the positive electrode tab is not coated with a positive electrode active substance layer. Taking the lithium-ion battery as an example, the material for the positive electrode current collector can be aluminum, and the positive electrode active material layer includes the positive electrode active material. The positive electrode active material can be lithium cobalt oxide, lithium iron phosphate, ternary lithium, or lithium manganese oxide. The negative electrode plate includes a negative electrode current collector and a negative electrode active material layer which is applied on a portion of the surface of the negative electrode current collector. The negative electrode current collector includes a negative electrode current collecting part and a negative electrode tab connected to the negative electrode current collecting part. The negative electrode current collecting part is coated with a negative electrode active substance layer, while the negative electrode tab is not coated with a negative electrode active substance layer. The material for the negative electrode current collector can be copper, and the negative electrode active material layer includes the negative electrode active material. The negative electrode active material can be carbon or silicon, etc. The material of the separator can be PP (polypropylene) or PE (polyethylene), etc.

The inventors noticed that with the continuous increase of the battery usage time, the relevant structural components inside the battery are subjected to various degrees of wear and tear, and there is a risk of thermal runaway of the battery cell inside the battery, which in turn leads to a wider range of thermal runaway inside the battery and poses certain safety hazards. After finding the above issues, the inventors conducted a systematic analysis and research on the structure and the usage environment of the cable. The results showed that once a certain battery cell inside the battery experienced thermal runaway, the temperature of the corresponding battery cell increased, and the temperature of the cable electrical connected thereto also increased. The cable usually includes a conductive member and an insulation member covering the outer surface of the conductive member. As the temperature of the cable increased, when it reached the melting point of the insulation member, the insulation member will melt and the conductive member inside the cable will be exposed. At this time, the conductive member is prone to forming a short circuit with other conductive structures inside the battery, which can lead to a wider range of thermal runaway of the battery, posing a certain safety hazard to the battery's use process.

The technical solution described in the embodiments of present application is applicable to the cable, the battery using the cable and the electricity consuming device using the battery.

The electricity consuming device can be vehicle, mobile phone, portable device, laptop, ship, spacecraft, electric toy, electric tool, and so on. The vehicle can be a fuel powered vehicle, a gas powered vehicle, or a new energy vehicle. The new energy vehicle can be a pure electric vehicle, a hybrid electric vehicle, or an extended range vehicle, etc. Spacecraft includes airplane, rocket, space shuttle, and spacecraft, among others. Electric toy includes fixed or mobile electric toy, such as game console, electric car toy, electric boat toy, and electric airplane toy. Electric tool includes metal cutting electric tool, grinding electric tool, assembly electric tool, and railway electric tool, such as electric drill, electric grinder, electric wrench, electric screwdriver, electric hammer, impact drill, concrete vibrator, and electric planer. The implementation example of present application does not impose special restrictions on the above-mentioned electricity consuming devices.

It should be understood that the technical solution described in the embodiments of present application is not only applicable to the battery and the electricity consuming device described above, but can also be applicable to all other batteries including the casing and the electricity consuming devices using the battery. However, for the sake of simplicity, the following embodiments are explained taking the electric vehicle as an example.

Please refer to FIG. 1, which is a structural schematic diagram of a vehicle 1 provided in some embodiments of the present application. The vehicle 1 can be a fuel powered vehicle, a gas powered vehicle, or a new energy vehicle. The new energy vehicle can be a pure electric vehicle, a hybrid electric vehicle, or an extended range vehicle, etc. The interior of the vehicle 1 is provided with a battery 10, which can be installed in the bottom, the front, or the rear of the vehicle 1. The battery 10 can be used for the power supply of the vehicle 1, for example, it can serve as the operating power supply of the vehicle 1. The vehicle 1 can also include a controller 11 and a motor 12, and the controller 111 is used to control the battery 10 to supply power to the motor 12, for example, for the starting, navigation, and operating power requirements of the vehicle 1.

In some embodiments of present application, the battery 10 can not only serve as the operating power source for the vehicle 1, but also as the driving power source for the vehicle 1, replacing or partially replacing the fuel or the natural gas to provide the driving power for the vehicle 1.

In order to meet different electricity consuming needs, the battery 10 can include multiple battery cells, which refer to the smallest unit that constitutes a battery module or battery pack. Multiple battery cells can be connected in series and/or in parallel through electrode terminals for various applications. The battery 10 mentioned in the present application includes battery module or battery pack. Multiple battery cells can be connected in series, parallel, or hybrid, and hybrid connection refers to the combination of series connection and parallel connection. In the embodiments of the present application, multiple battery cells can directly form a battery pack, or they can first form a battery module, which then forms a battery pack.

Figure 2:
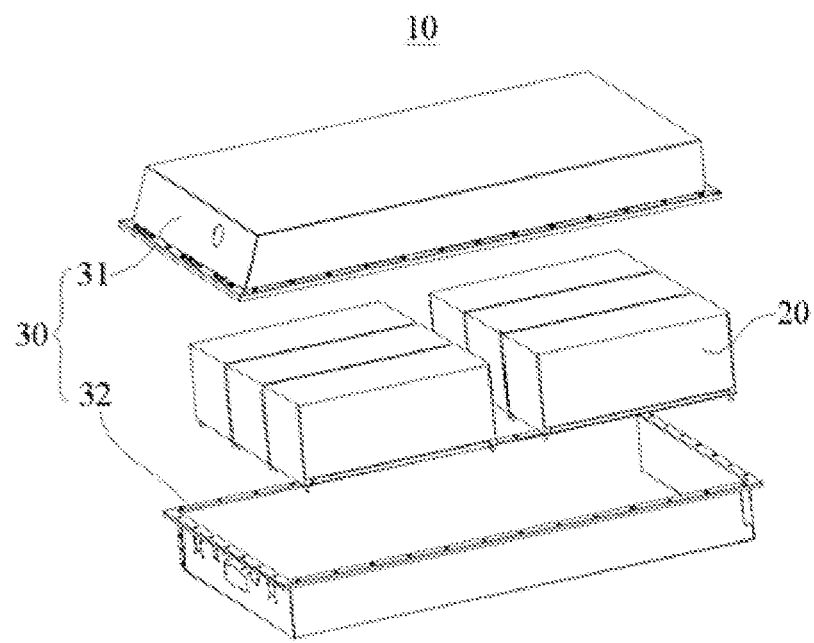
FIG. 2 is a structural schematic diagram of a battery provided in an embodiment of the present application.

FIG. 2 illustrates the structural schematic diagram of the battery 10 in an embodiment of the present application.

As shown in FIG. 2, the battery 10 includes a casing 30 and a battery cell (not shown) which is accommodated within the casing 30.

The casing 30 can be a simple three-dimensional structure such as a single cuboid, cylinder, or sphere, or a complex three-dimensional structure composed of a combination of simple three-dimensional structures such as a cuboid, a cylinder, or a sphere. The embodiments of the present application are not limited to thereto. The material of the casing 30 can be alloy material such as aluminum alloy and iron alloy, or polymer material such as polycarbonate, polyisocyanurate foam plastic, or composite materials such as glass fiber and epoxy resin, but the embodiments of the present application are not limited thereto.

The casing 30 is used to accommodate the battery cell, and the casing 30 can be of various structures. In some embodiments, the casing 30 may include a first casing body 31 and a second casing body 32, with the first casing body 31 and the second casing body 32 covering each other. The first casing body 31 and the second casing body 32 jointly define an accommodating chamber for accommodating the battery cell. The second casing body 32 can be a hollow structure with an opening at one end, the first casing body 31 is a plate-like structure, and the first casing body 31 covers and closes the opening side of the second casing body 32 to form a casing 30 with an accommodating chamber. The first casing body 31 and the second casing body 32 can also be hollow structures with openings on one side. The opening side of the first casing body 31 covers and closes the opening side of the second casing body 32 to form a casing 30 with an accommodating chamber. Of course, the first casing body 31 and the second casing body 32 can have various shapes such as cylinder, cuboid.

To improve the sealing performance after connecting the first casing body 31 and the second casing body 32, sealing elements such as sealant, sealing rings, etc. can also be installed between the first casing body 31 and the second casing body 32.

Assuming that the first casing body 31 covers and closes the top of the second casing body 32, the first casing body 31 can also be referred to as the upper casing cover, and the second casing body 32 can also be referred to as the lower casing.

In a battery 10, there may be one or multiple battery cells. If multiple battery cells are provided, multiple battery cells can be connected in series, parallel, or hybrid. Hybrid connection refers to the combination of connections in series and parallel among multiple battery cells. Multiple battery cells can be directly connected in series, parallel, or hybrid together, and then the whole composed of multiple battery cells can be accommodated in the casing 30. Of course, multiple battery cells can also be connected in series, parallel, or hybrid to form a battery module 20. Multiple battery modules 20 can then be connected in series, parallel, or hybrid to form a whole and accommodated in the casing 30.

Figure 3:
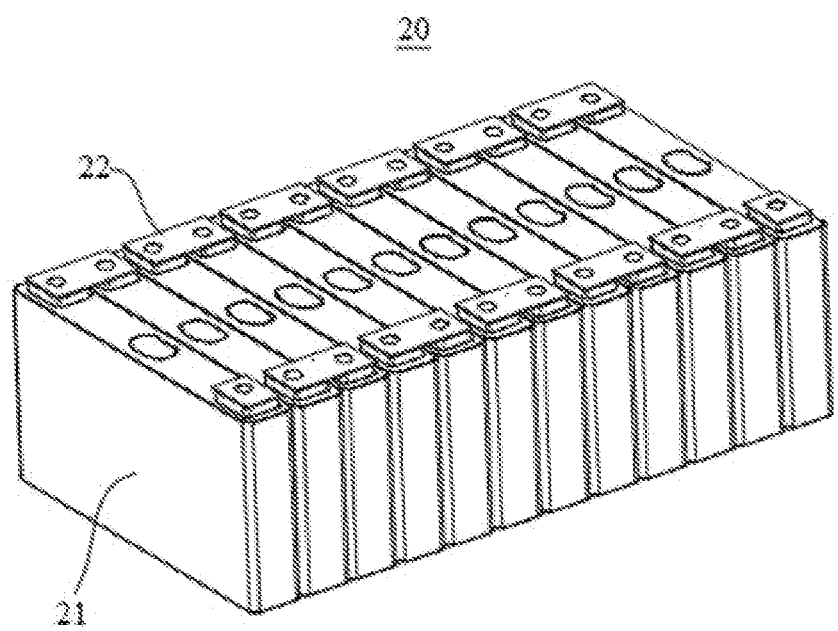
FIG. 3 is a structural schematic diagram of a battery module in a battery provided in an embodiment of the application.

FIG. 3 illustrates the structural diagram of the battery module 20 in an embodiment of the present application.

In some embodiments, as shown in FIGS. 3, multiple battery cells 21 are provided. Multiple battery cells 21 are first connected in series, parallel, or hybrid to form a battery module 20. Multiple battery modules 20 are then connected in series, parallel, or hybrid to form a whole and accommodated within the casing 30.

Multiple battery cells 21 in the battery module 20 can be electrically connected through a busbar 22 to achieve parallel, series, or hybrid connection of multiple battery cells 21 in the battery module 20.

In the present application, the battery cell 21 can include lithium ion battery cell, sodium ion battery cell, or magnesium ion battery cell, etc. The embodiments of the present application are not limited to thereto. The battery cell 21 can be in shape of cylinder, flat body, cuboid, or other shapes, and the embodiments of the present application are not limited to thereto. The battery cell 21 is generally divided into three types according to packaging methods: cylindrical battery cell, square battery cell, and soft pack battery cell. The embodiments of the present application are not limited to thereto. However, for the sake of simplicity, the following embodiments are illustrated using the square battery cell as an example.

Figure 4:
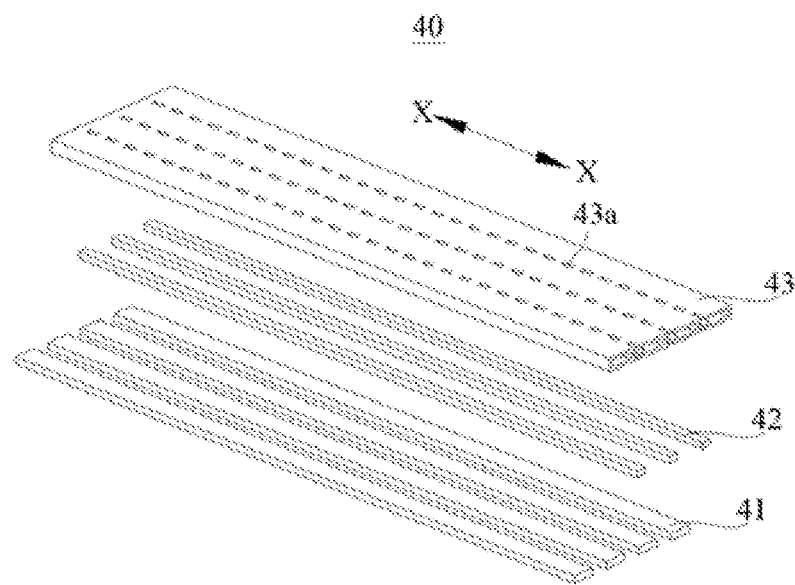
FIG. 4 is a an exploded structural schematic diagram of a cable provided in an embodiment of the present application.

Please refer to FIG. 4, which is an exploded schematic diagram of the cable 40 provided in some embodiments of the present application. The cable 40 includes a conductive member 41, an expansion member 42, and an insulation member 43. The conductive member 41 extends along a longitudinal direction X of the cable 40, and the expansion member 42 is spaced with the conductive member 41. The insulation member 43 covers the periphery of the conductive member 41 and the expansion member 42, and the insulation member 43 has a through hole 43a, wherein the expansion member 42 is configured to expand and overflow to the outer surface of the insulation member 43 through the through hole 43a when the temperature reaches a threshold.

Specifically, the conductive member 41 and the expansion member 42 can be spaced by the insulation member 43, and the cable 40 can attain electrical connection between different components in the battery 10 through the conductive member 41, and insulation from unrelated components through the insulation member 43.

Optionally, the cable 40 can be electrically connected to different components inside the battery 10, or electrically connected to the components inside the battery 10 and the components outside the battery 10. For example, the cable 40 can be electrically connected to the busbar 22 inside the battery 10 and the control chip outside the battery 10 to collect signals such as temperature and voltage inside the battery 10, thereby mastering the operating conditions inside the battery 10.

Optionally, the conductive member 41 can be made of copper or other conductive metals without any restrictions.

Optionally, the cross-section of the conductive member 41 can be circular, rectangular, or elliptical. The same cable 40 can include multiple conductive members 41, and the cross-sectional shapes of the multiple conductive members 41 can be the same or different.

The expansion member 42 can be integrally formed from the expansion material or can be provided by wrapping the expansion material with another material. The expansion member 42 can be continuously disposed along the longitudinal direction X, or it can be disposed into multiple segments along the longitudinal direction X. When the expansion member 42 is disposed into multiple segments, the length of each segment of the expansion member 42 and the spacing between adjacent expansion members 42 along the longitudinal direction X can be set according to actual needs.

When the related components, such as battery cell 21, connected to the cable 40 inside the battery 10 experience the thermal runaway or other issues, the temperature of the battery cell 21 rises and is transmitted to the cable 40 through the intermediate connection members such as the busbar 22. When the temperature of the cable 40 rises to the expansion temperature of the expansion member 42, the expansion member 42 expands and overflows to the outer surface of the insulation member 43 through the through hole 43a to prevent heat from being transmitted to the insulation member 43 continuously, thereby reducing the risk of the melting of the insulation member 43.

Optionally, the expansion temperature of the expansion member 42 is lower than the melting temperature of insulation member 43, so that before the insulation member 43 melts, the insulation member 43 will be covered by the material of the expansion member. The specific threshold value can be set according to the operating condition of the battery 10. For example, the normal operating temperature of the battery cell 21 is below 100° C. When the temperature of the battery cell 21 reaches above 100° C., it is considered that the battery cell 21 has experienced thermal runaway. At this time, the expansion temperature of expansion member 42 can be set as a threshold temperature of 100° C.~150° ° C. so that at the time of the thermal runaway of the battery cell 21, the expansion member 42 expands in a timely manner and covers the outer surface of the insulation member 43 to protect the insulation member 43.

Optionally, the through hole 43a can be arranged in a direction perpendicular to the longitudinal direction X, so that when the expansion member 42 expands, it can quickly cover the surface of the insulation member 43 through the through hole 43a.

The cable 40 provided in the embodiments of the present application is provided with the expansion member 42 which expands and overflows to the outer surface of the insulation member 43 through the through hole 43a when the temperature reaches a threshold. Therefore, when the temperature of the battery cell 21 and other components inside the battery 10 is too high, the expansion member 42 overflows and protects the insulation member 43, reducing the risk of short circuit between the conductive member 41 of the cable 40 and other components inside the battery 10 caused by the melting of the insulation member 43, and further reducing the risk of a larger range of temperature rise occurring inside the battery 10 and improving the operational safety of the battery 10.

Optionally, one or multiple through holes 43a can be provided. When multiple through holes 43a is provided, the size and shape of multiple through holes 43a can be the same or different, as long as they can provide a channel for the overflow of expansion member 42, and can be selected according to specific needs.

In some embodiments, the cable 40 includes multiple through holes 43a, which are spaced along the longitudinal direction X.

Specifically, multiple through holes 43a can be spaced along only the longitudinal direction X, or can be spaced also in a direction perpendicular to the longitudinal direction, i.e. multiple through holes 43a can be arranged in a matrix. Multiple through holes 43a are arranged along the longitudinal direction X, and the expansion member 42 overflows from the multiple through holes 43a arranged along the longitudinal direction X during the expansion process. As a result, the overflowing expansion member 42 is arranged along the longitudinal direction X of the cable 40 to ensure that the insulation member 43 of the cable 40 can be covered with more of the expansion member 42, which has better heat resistance effect and can protect the insulation member 43 better.

Optionally, the spacings between multiple through holes 43a can be equal or unequal, and can be selected according to actual needs.

In some embodiments, multiple through holes 43a are equally spaced.

Specifically, the spacing size between the through holes 43a can be set based on the extent to which the expansion member 42 overflowing from each through hole 43a cover the insulation member 43, so as to ensure that the insulation member 43 between adjacent through holes 43a can be covered by the expansion member 42 overflowing from the through hole 43a.

It can be understood that multiple through holes 43a are equally spaced, which can make the expansion member overflowing from the through hole 43a cover the insulation member 43 more evenly, in order to better protect the insulation member 43, and further reduce the risk of the short circuit of the conductive member 41 caused by the melting of the insulation member 43.

Optionally, an axial direction of the through hole 43a can be disposed perpendicular to the surface of the expansion member 42 or inclined to the surface of the expansion member 42. The through hole 43a has a function of guiding the overflow direction of the expanded expansion member 42. Therefore, disposing a suitable axial direction of the through hole 43a can cause the expansion member 42 to overflow along a predetermined path in a predetermined direction. The axial direction of the through hole 43a is not limited herein, and the present application can be disposed according to specific needs.

Optionally, the cross-sectional shape of the through hole 43a perpendicular to the axial direction can be polygonal, elliptical, circular, or other irregular shapes without limitation.

In some embodiments, the cross-section of the through hole 43a perpendicular to the axial direction can be circular, elliptical, or rectangular.

Specifically, the cross-sectional shape of the through hole 43a corresponding to the same cable 40 perpendicular to the axial direction can be the same or different, and can be disposed according to factors such as the specific location of the through hole 43a and the shape of the surrounding insulation member 43.

It can be understood that disposing the cross-section of the through hole 43a perpendicular to the axial direction to be circular, elliptical, or rectangular can improve the smoothness of the overflowing of the expansion member through the through hole 43a after expansion.

Optionally, one cable 40 may include one conductive member 41 or multiple conductive members 41. When one cable 40 includes multiple conductive members 41, it is beneficial to improving the current carrying capacity of the cable 40.

Figure 5:
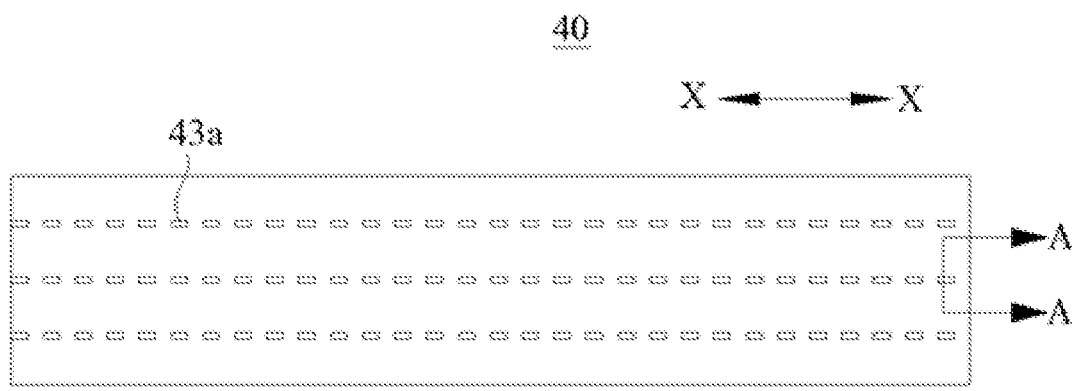
FIG. 5 is a structural schematic diagram of a top view of a cable provided in an embodiment of the present application.
Figure 6:
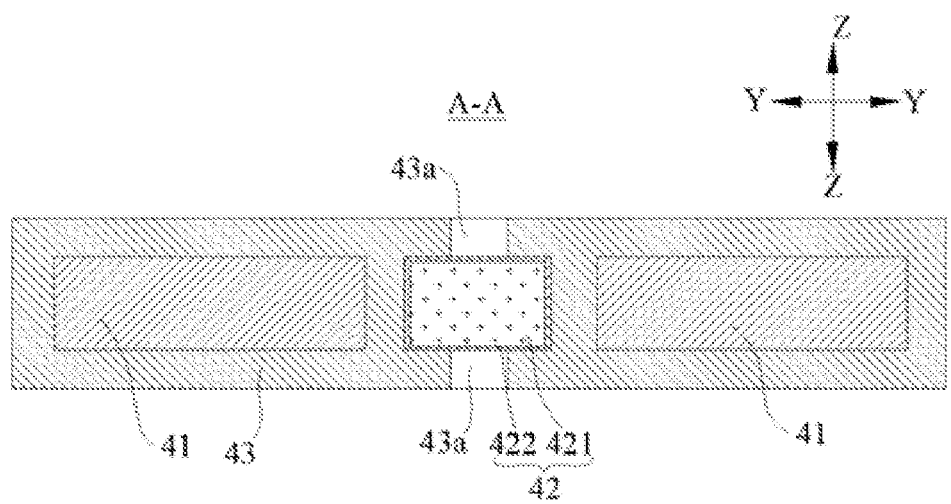
FIG. 6 is a schematic diagram of a cross-sectional structure along A-A in FIG. 5.

Please refer to FIGS. 5 and 6. In some embodiments, the cable 40 includes multiple conductive members 41, which are spaced along the first direction Y, at least one expansion member 42 is disposed between the spaced conductive members 41, and the first direction Y is perpendicular to the longitudinal direction X.

Specifically, multiple conductive members 41 can be spaced along the first direction through the insulation member 43 so as to insulate the multiple conductive members 41 from each other in the first direction Y.

Specifically, at least one expansion member 42 is provided between every two adjacent conductive members 41 in the first direction Y. Optionally, one, two, or more expansion members 42 may be provided between two adjacent conductive members 41.

It can be understood that disposing the conductive member 41 at intervals along the first direction Y is beneficial for forming a flat shaped cable 40, so that the cable 40 occupies less space when the cable 40 is arranged inside the battery 10, and is beneficial for improving the volume energy density of the battery 10. By disposing at least one expansion member 42 between every two adjacent conductive members 41, when the expansion member 42 expands, it can overflow through the through hole 43a and covers the insulation member 43 on the surface of the corresponding conductive member 41, further reducing the risk of short circuit of the conductive member 41.

Optionally, the through hole 43a can be disposed on either side of the expansion member 42, as long as it can cause the expansion member 42 to overflow through the through hole 43a.

In some embodiments, the through hole 43a is arranged at at least one end of the expansion member 42 along the second direction Z, with the second direction Z, the first direction Y, and the longitudinal direction X perpendicular to each other.

Specifically, the through hole 43a can be provided at either end of the expansion member 42 along the second direction Z, or at both ends of the expansion member 42 along the second direction Z.

It can be understood that disposing the through hole 43a on both sides of the expansion member 42 along the second direction Z is beneficial for improving the smoothness of the outflow of the expansion member 42 through the through hole 43a and covering the surface of the insulation member 43.

Figure 7:
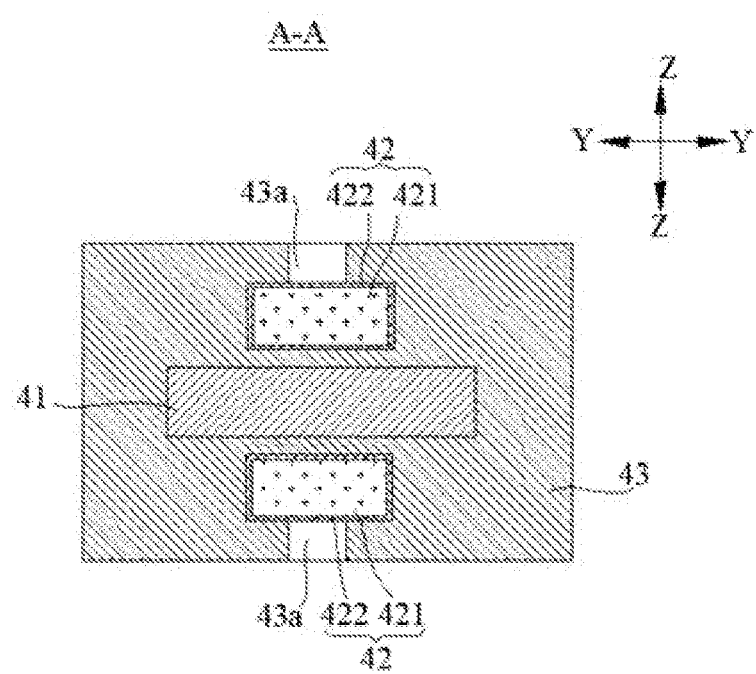
FIG. 7 is a schematic diagram of another cross-sectional structure along A-A in FIG. 5.

Please refer to FIGS. 5 and 7. In some embodiments, along the second direction Z, the expansion members 42 are arranged on both sides of the conductive member 41, and the second direction Z, the first direction Y, and the longitudinal direction X are perpendicular to each other.

Specifically, the expansion member 42 can be disposed on the positive side of the conductive member 41 along the second direction Z, or it can be disposed diagonally, that is, the forward projection of the expansion member 42 along the second direction Z and the forward projection of the conductive member 41 along the second direction Z can completely overlap, partially overlap, or not overlap.

It can be understood that expansion members 42 are disposed on both sides of the conductive member 41 along the second direction Z. During the expansion of the expansion members 42, the expansion members 42 can cover on both sides of the cable 40 along the second direction Z, in order to protect the insulation member 43 better.

In some embodiments, along the second direction Z, the through hole 43a is arranged on the side of the expansion member 42 away from the conductive member 41.

Disposing the through hole 43a on the side of the expansion member 42 away from the conductive member 41 is beneficial for the expansion member 42 to overflow to the outer surface of the insulation member 43 through the through hole 43a during expansion.

In some embodiments, the expansion member 42 includes an insulating expansion body 421 and a wrapping member 422 covering the insulating expansion body 421, with the melting point of the wrapping member 422 lower than that of the insulation member 43. The wrapping member 422 is configured to melt when the temperature reaches a threshold, and the insulating expansion body 421 is configured to expand and overflow to the surface of the insulation member 43 through the through hole 43a when the wrapping member 422 melts.

Specifically, when the wrapping member 422 melts, the insulating expansion body 421 covered with and disposed inside the wrapping member 422 expands and overflows to the outer surface of the insulation member 43 through the through hole 43a. The melting point of wrapping member 422 is disposed to be lower than that of insulation member 43, then before insulation member 43 begins to melt, the wrapping member 422 has already melted, and the insulating expansion body 421 covered with and disposed inside the wrapping member 422 expands and overflows to the surface of insulation member 43.

In this way, the melting point of the wrapping member 422 can be tailored by virtue of the specific material of the wrapping member 422 so as to control the expansion temperature of the expansion member 42. Before the insulation member 43 melts, it will be covered by the insulating expansion body 421. The insulating expansion body 421 can insulate the cable 40 from the outside and has a certain heat insulation effect to protect the insulation member 43 and reduce the probability of the melting of the insulation member 43. And even if the insulation member 43 melts completely as the internal temperature of the battery 10 increases to reach the melting point of the insulation member 43, the conductive member 41 will not experience a short circuit because the insulating expansion body 421 covers the outer surface of the conductive member 41, thereby further reducing the risk of the short circuit occurring in the conductive member 41 of the cable 40.

It can be understood that the material of the insulating expansion body 421 can be any material that can be insulated and expand, and can be selected according to the needs.

In some embodiments, the material of the insulating expansion body 421 includes expandable graphite.

It can be understood that expandable graphite can expand when the wrapping member 422 melts, and the expandable graphite has a low price and has good insulation and a high melting point. It can withstand a temperature over 3000° C., which can effectively prevent external heat from spreading to the insulation member 43. Under a condition that the internal temperature of the battery 10 is high, the conductive member 41 can still maintain insulated from the outside, thereby further reducing the risk of the short circuit of the conductive member 41.

In some embodiments, the material of the wrapping member 422 includes polyethylene terephthalate, and the material of the insulation member 43 includes polypropylene.

The melting point of polyethylene terephthalate is lower than that of polypropylene, which can effectively ensure that the wrapping member 422 begins to melt before the insulation member 43 melts, in order to release the insulating expansion body 421. Moreover, polyethylene terephthalate and polypropylene have relative low prices and are easy to obtain.

According to some embodiments of the present application, the present application also provides a battery 10, including multiple battery cells 21, a busbar 22, and a cable 40 provided by any of the above embodiments. The busbar 22 is electrically connected to multiple battery cells 21. The conductive member 41 of the cable 40 is connected to the busbar 22.

Specifically, the cable 40 can be electrically connected to the busbar 22 and the controlling devices inside or outside the battery 10 to collect voltage, temperature, and other information of the busbar 22.

The battery 10 provided in the embodiments of the present application has the same technical effect due to the use of the cable 40 provided in any of the above embodiments, and will not be repeated here.

According to some embodiments of the present application, the present application also provides an electricity consuming device, including a battery 10 as described in any of the above solutions, and the battery 10 is configured to provide electrical energy for the electricity consuming device.

The electricity consuming device can be any of the aforementioned devices or systems that use the battery 10.

The electricity consuming device provided in the embodiments of the present application has the same technical effect as the battery 10 provided in the embodiments of the present application, and will not be further described here.

Finally, it should be noted that the above embodiments are only used to illustrate the technical solutions of the present application and not to limit thereto; Although the present application has been described in detail with reference to the aforementioned embodiments, the skilled person in the art should understand that they can still modify the technical solutions recorded in the aforementioned embodiments, or equivalently replace some or all of the technical features; These modifications or substitutions do not separate the essence of the corresponding technical solutions from the scope of the technical solutions of the various embodiments of the present application, and they should all be covered within the scope of the claims and specifications of the present application. Especially, as long as there is no structural conflict, the various technical features mentioned in each embodiment can be combined in any way. The present application is not limited to the specific embodiments disclosed in the text, but includes all technical solutions falling within the scope of the claims.

What is claimed is:

1. A cable for a battery, comprising:
   a conductive member extending in a longitudinal direction of the cable;
   an expansion member spaced with the conductive member; and
   an insulation member covering a periphery of the conductive member and a periphery of the expansion member, the insulation member having a through hole;

wherein:
   the expansion member is configured to expand and overflow to an outer surface of the insulation member through the through hole when a temperature of the expansion member reaches a threshold; and
   the expansion member comprises an insulating expansion body and a wrapping member covering the insulating expansion body, a melting point of the wrapping member is lower than a melting point of the insulation member, the wrapping member is configured to melt when the temperature of the expansion member reaches the threshold, and the insulating expansion body is configured to expand and overflow to the outer surface of the insulation member through the through hole when the wrapping member melts.

2. The cable according to claim 1, wherein the through hole is one of a plurality of through holes spaced along the longitudinal direction.

3. The cable according to claim 2, wherein the plurality of through holes are equally spaced.

4. The cable according to claim 2, wherein a cross-section of the through hole perpendicular to an axial direction of the through hole is circular, elliptical, or rectangular.

5. The cable according to claim 1, wherein the conductive member is one of a plurality of conductive members spaced along a first direction, the expansion member is arranged between the spaced conductive members, and the first direction is perpendicular to the longitudinal direction.

6. The cable according to claim 5, wherein the through hole is arranged at at least one end of the expansion member along a second direction, and the second direction, the first direction, and the longitudinal direction are perpendicular to each other.

7. The cable according to claim 1, wherein the expansion member is arranged on one side of the conductive member along a second direction, and the second direction and the longitudinal direction are perpendicular to each other.

8. The cable according to claim 7, wherein the through hole is arranged on a side of the expansion member away from the conductive member along the second direction.

9. The cable according to claim 1, wherein a material of the insulating expansion body includes expandable graphite.

10. The cable according to claim 1, wherein a material of the wrapping member includes polyethylene terephthalate, and a material of the insulation member includes polypropylene.

11. A battery comprising:
    multiple battery cells;
    a busbar electrically connected to the multiple battery cells; and
    the cable according to claim 1, wherein the conductive member of the cable is connected to the busbar.

12. An electricity consuming device comprising the battery according to claim 11, wherein the battery is configured to provide electrical energy.

* * * * *